United States Patent
Hoshino et al.

(10) Patent No.: US 10,686,204 B2
(45) Date of Patent: Jun. 16, 2020

(54) SOLID OXIDE FUEL CELL SYSTEM

(71) Applicant: NISSAN MOTOR CO., LTD., Yokohama-shi, Kanagawa (JP)

(72) Inventors: Maki Hoshino, Kanagawa (JP); Tatsuya Yaguchi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/750,682

(22) PCT Filed: Aug. 10, 2015

(86) PCT No.: PCT/JP2015/072660
§ 371 (c)(1),
(2) Date: Feb. 6, 2018

(87) PCT Pub. No.: WO2017/026037
PCT Pub. Date: Feb. 16, 2017

(65) Prior Publication Data
US 2018/0261869 A1 Sep. 13, 2018

(51) Int. Cl.
*H01M 8/12* (2016.01)
*H01M 8/0432* (2016.01)
(Continued)

(52) U.S. Cl.
CPC ............ *H01M 8/12* (2013.01); *H01M 4/905* (2013.01); *H01M 8/04276* (2013.01);
(Continued)

(58) Field of Classification Search
None
See application file for complete search history.

(56) References Cited

U.S. PATENT DOCUMENTS 6,977,064 B1 * 12/2005 Adris .................. B01J 8/065
422/145
7,150,866 B2 * 12/2006 Wieland ................ B01J 23/40
423/652

(Continued)

FOREIGN PATENT DOCUMENTS

CN 1707839 A 12/2005
EP 0575883 * 6/1993 ............. H01M 8/06
(Continued)

OTHER PUBLICATIONS

Yoshio Ono et al., Dictionary of Catalysts, Nov. 1, 2000, 6 pages, Asakura Publishing Co, Ltd., Japan.
(Continued)

*Primary Examiner* — Amanda J Barrow
(74) *Attorney, Agent, or Firm* — Foley & Lardner LLP

(57) ABSTRACT

A solid oxide fuel cell system includes a primary fuel supply passage for supplying fuel, plural fuel cell stacks each uses a solid oxide fuel cell and that are provided in line on the primary fuel supply passage and includes at least a first fuel cell stack and a second fuel cell stack, a first reformer that is provided on an upstream side from the first fuel cell stack on the primary fuel supply passage and reforms the fuel by utilizing endothermic reforming reactions, a second reformer that is provided between the first fuel cell stack and the second fuel cell stack on the primary fuel supply passage and reforms the fuel by utilizing endothermic reforming reactions and exothermic methanation reactions, and a secondary fuel supply passage connected between the first fuel cell stack and the second reformer.

16 Claims, 7 Drawing Sheets

(51) Int. Cl.

| | |
|---|---|
| *H01M 8/04276* | (2016.01) |
| *H01M 8/2425* | (2016.01) |
| *H01M 8/06* | (2016.01) |
| *H01M 4/90* | (2006.01) |
| *H01M 8/0612* | (2016.01) |
| *H01M 8/04746* | (2016.01) |
| *H01M 8/04858* | (2016.01) |
| *H01M 8/124* | (2016.01) |
| *H01M 4/86* | (2006.01) |

(52) U.S. Cl.
CPC ... *H01M 8/04373* (2013.01); *H01M 8/04753* (2013.01); *H01M 8/04776* (2013.01); *H01M 8/04925* (2013.01); *H01M 8/06* (2013.01); *H01M 8/0618* (2013.01); *H01M 8/2425* (2013.01); *H01M 2004/8684* (2013.01); *H01M 2004/8689* (2013.01); *H01M 2008/1293* (2013.01)

(56) References Cited

U.S. PATENT DOCUMENTS

| | | |
|---|---|---|
| 7,470,477 B2 | 12/2008 | Zizelman et al. |
| 7,641,994 B2 | 1/2010 | Hansen |
| 8,057,947 B2 | 11/2011 | Foger et al. |
| 8,394,544 B2 | 3/2013 | Chick et al. |
| 2004/0063577 A1 | 4/2004 | Wieland et al. |
| 2005/0037249 A1 | 2/2005 | Zizelman et al. |
| 2005/0271912 A1 | 12/2005 | Hansen |
| 2010/0035112 A1 | 2/2010 | Kim et al. |
| 2010/0135870 A1 | 6/2010 | Mizuno et al. |
| 2011/0223500 A1 | 9/2011 | Uematsu et al. |
| 2011/0223502 A1* | 9/2011 | Maruyama ............... C01B 3/40 429/420 |
| 2013/0216926 A1* | 8/2013 | Otsuka ............ H01M 8/04022 429/423 |
| 2015/0086887 A1 | 3/2015 | Matsuo et al. |
| 2016/0190622 A1* | 6/2016 | Whyatt ............... H01M 8/0662 429/423 |

FOREIGN PATENT DOCUMENTS

| | | | |
|---|---|---|---|
| EP | 1 393 804 A1 | 3/2004 | |
| EP | 1 507 302 A2 | 2/2005 | |
| JP | 62-283563 A | 12/1987 | |
| JP | 06-104000 | * 4/1994 | ......... H01M 8/0612 |
| JP | 08-339815 | * 12/1996 | ............. H01M 8/04 |
| JP | 2004-67454 A | 3/2004 | |
| JP | 2010-132482 A | 6/2010 | |
| JP | 4994686 B2 | 8/2012 | |
| JP | 2014-229438 | * 5/2013 | ............. H01M 8/04 |
| JP | 2013-191572 A | 9/2013 | |
| JP | 2013-225486 A | 10/2013 | |
| JP | 2014-229438 A | 12/2014 | |

OTHER PUBLICATIONS

Handbook of Chemistry, Applied Chemistry I, 6$^{th}$ Edition, The Chemical Society of Japan, Jan. 30, 2003, 7 pages.

Takuya Suenaga et al, Production of Hydrogen by Steam Reforming of Glycerin on Ni Loaded Catalyst, 55$^{th}$ R&D Symposium of the Japan Petroleum Institute, Jul. 18, 2006, 3 pages.

Yuji Tsuda et al., Additive Effect of Base Component on $CO_2$ Methanation Activity of Supported Ni Catalyst, 44$^{th}$ Petroleum-Petrochemical Symposium of JPI, Oct. 24, 2017 4 pages.

* cited by examiner

SOLID OXIDE FUEL CELL SYSTEM

TECHNICAL FIELD

The present invention relates to a fuel cell system of a type using solid oxide.

BACKGROUND ART

Although fuel cell vehicles (FCEV) are now generally sold, a polymer electrolyte fuel cell (PEFC) that uses hydrogen gas as fuel is adopted in such FCEVs. In addition, business-use or home-use stationary electric power sources that adopt a solid oxide fuel cell (SOFC) are now also generally sold. The SOFC has a feature that its operational temperature is high but its efficiency is high. In such an SOFC system, its start-up takes much time in order to increase temperature of its fuel cell stacks (FC stacks) to its high operational temperature.

In order to adapt a solid oxide fuel cell (SOFC) to a mobile vehicle such as a fuel cell vehicle (FCEV), it is necessary to shorten its start-up time while getting a required output power. Therefore, a Patent Literature 1 listed below discloses an SOFC system that includes a small-sized FC stack and a large-sized FC stack. In this SOFC system, it is proposed that temperature of the small-sized FC stack is quickly increased to its operational temperature first to make the SOFC system operable and then temperature of the large-sized FC stack is also increased to its operational temperature to get stable output power. Note that shortening of a start-up time is advantageous not only for mobile vehicles but also for stationary electric power sources.

CITATION LIST

Prior-Art Literature

Patent Literature 1: EP1507302A2

SUMMARY OF INVENTION

In the FC system disclosed by the Patent Literature 1, fuel gas is preliminarily reformed by a single reformer, and then the reformed fuel gas (reformed gas) is sent to the small-sized FC stack and the large-sized FC stack. In addition, anode off-gas from the small-sized FC stack is also sent to the large-sized FC stack further in order to utilize unused fuel contained in the anode off-gas. Since entire fuel (fuel for the small-sized FC stack and fuel for the large-sized FC stack) is reformed by the single reformer in this FC system, a large amount of methane is contained in the reformed gas. Steam reforming reactions of methane progress along with electricity generation at the small-sized FC stack, but a steam reforming reaction is an endothermic reaction. Therefore, it is difficult to keep the temperature of the small-sized FC stack at its appropriate operational temperature. Note that it is also proposed to introduce air into reformed fuel, but it brings large reduction of efficiency.

An object of the present invention is to provide a solid oxide fuel cell system that can start-up quickly and can achieve its stable operation by utilizing exothermic methanation reactions.

An aspect of the present invention provide a solid oxide fuel cell system that includes a primary fuel supply passage for supplying fuel, and a plural fuel cell stacks each uses a solid oxide fuel cell and provided in line on the primary fuel supply passage. The plural fuel cell stacks includes at least a first fuel stack on an upstream side and a second fuel cell stack on a downstream side. A first reformer for reforming the fuel by utilizing endothermic reforming reactions is disposed on an upstream side from the first fuel stack on the primary fuel supply passage. A second reformer for reforming the fuel by utilizing endothermic reforming reactions and exothermic methanation reactions is disposed between the first fuel cell stack and the second fuel cell stack on the primary fuel supply passage. A secondary fuel supply passage is connected between the first fuel cell stack and the second reformer.

Effects by Invention

The first reformer is disposed upstream from the first stack, and the second reformer for reforming the fuel by utilizing exothermic methanation reactions in addition to endothermic reforming reactions is disposed upstream from the second stack. Therefore, reforming of the fuel required for the whole solid oxide fuel cell system is done in cooperation of the first reformer and the second reformer, and thereby temperature reduction at the first stack can be restricted. In addition, temperature of reformed gas supplied from the second reformer to the second stack can be increased by the exothermic methanation reactions at the second reformer, and thereby the second stack can be operated stably by keeping temperature of the second stack at its appropriate operational temperature.

DESCRIPTION OF EMBODIMENTS

Hereinafter, embodiments of a solid oxide fuel cell system will be described with reference to the drawings.

Figure 1:
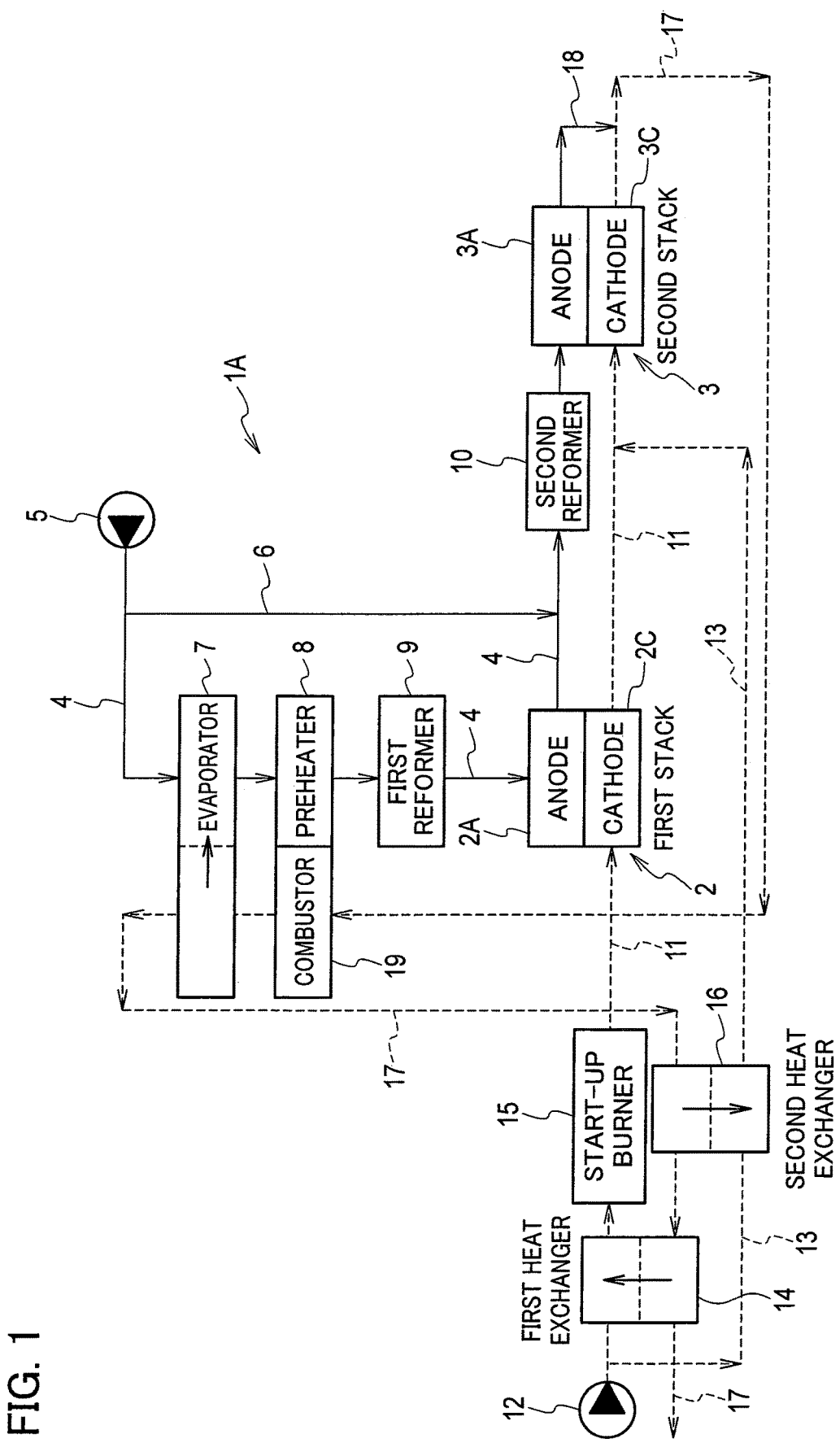
FIG. 1 It is a configuration diagram of a solid oxide fuel cell system according to a first embodiment.

First, a solid oxide fuel cell (SOFC) system 1A according to a first embodiment will be described. The SOFC system 1A is installed in a fuel cell vehicle (ECEV), and, as shown in FIG. 1, includes a first stack 2 that is a fuel cell stack (FC stack) utilizing a solid oxide fuel cell (SOFC) and a second stack 3 that is a FC stack utilizing an SOFC and whose electricity generation capacity is larger than that of the first stack. The first stack 2 has an anode (a fuel electrode) 2A and a cathode (an air electrode) 2C. The second stack 3 also has an anode 3A and a cathode 3C.

The first stack 2 (the anode 2A) on an upstream side and the second stack 3 (the anode 3A) on a downstream side are arranged in line on a primary fuel supply passage 4. The primary fuel supply passage 4 supplies fuel sequentially to the anode 2A of the first stack 2 and the anode 3A of the second stack 3. In addition, a fuel pump 5 connected with a fuel tank (not shown in the drawings) is provided on an upstream end of the primary fuel supply passage 4. Fuel is flown to the primary fuel supply passage 4 and an after-described secondary fuel supply passage 6 by the fuel pump 5. In the present embodiment, liquid methanol or methanol-waster solution is used as the fuel. Generally, liquid fuel provides a longer running distance per volume than gas fuel, and has a superior feature as fuel for a vehicle i.e. capable of being stocked in a vehicle using a fuel tank without need of a high-pressure tank or the like (good portability).

An evaporator 7 (heat-receiving side), a preheater 8 and a first reformer 9 are provided between the fuel pump 5 and the first stack 2 (the anode 2A) on the primary fuel supply passage 4 in this order from the upstream side. The evaporator 7 is a heat exchanger, and vaporizes fuel by giving heats of cathode off-gas to the fuel being supplied through the primary fuel supply passage 4. The preheater 8 heats fuel gas discharged from the evaporator 7 to temperature adequate for reforming reactions at the first reformer 9 by utilizing heats generated at an after-described combustor 19. The first reformer 9 reforms fuel gas discharged from the preheater 8 into a state adequate for electricity generation at the first stack 2 by utilizing steam reforming reactions. Reformed gas discharged from the first reformer 9 is used for the electricity generation at the first stack 2, and then discharged from the first stack 2 (the anode 2A) as anode off-gas.

In addition, a second reformer 10 is provided between the first stack 2 (the anode 2A) and the second stack 3 (the anode 3A) on the primary fuel supply passage 4. Further, the secondary fuel supply passage 6 is diverged from the primary fuel supply passage 4 between the fuel pump 5 and the evaporator 7. The secondary fuel supply passage 6 is converged to the primary fuel supply passage 4 between the first stack 2 (the anode 2A) and the second reformer 10 (i.e. on an upstream side of the second reformer 10). Namely, mixed gas of the anode off-gas discharged from the first stack 2 (the anode 2A) and the fuel supplied through the secondary fuel supply passage 6 is supplied to the second reformer 10 as fuel. Since the operational temperature of the first stack 2 as an SOFC is high, temperature of the anode off-gas discharged from the first stack 2 (the anode 2A) is high and thereby the fuel liquid from the secondary fuel supply passage 6 is vaporized to be the mixed gas. The second reformer 10 reforms the mixed gas fuel into a state adequate for the electricity generation at the second stack 3 by utilizing not only endothermic reforming reactions but also exothermic methanation reactions (described in detail later). The reformed gas discharged from the second reformer 10 is used for the electricity generation at the second stack 3, and then discharged from the second stack 3 (the anode 3A) as anode off-gas.

On the other hand, the first stack 2 (a cathode 2C) and the second stack 3 (a cathode 3C) are arranged in line also on a primary air supply passage 11. The primary air supply passage 11 supplies oxygen in air sequentially to the cathode 2C of the first stack 2 and the cathode 3C of the second stack 3. In addition, an air pump 12 connected with an air filter (not shown in the drawings) is provided on an upstream end of the primary air supply passage 11. Air is flown to the primary air supply passage 11 and an after-described secondary air supply passage 13 by the air pump 12.

A first heat exchanger 14 (heat receiving side) and a start-up burner 15 are provided between the air pump 12 and the first stack 2 (the cathode 2C) on the primary air supply passage 11 in this order from the upstream side. The first heat exchanger 14 heats air being supplied through the primary air supply passage 11 by the air pump 12 to temperature adequate for the electricity generation at the first stack 2 by heats of cathode off-gas being discharged through an after-described off-gas exhaust passage 17. The start-up burner 15 is operated at an start-up of the SOFC system 1A, and heats air being supplied through the primary air supply passage 11 by the air pump 12 to heat the first stack 2 and the second stack 3 quickly to their operational temperatures by the heated air.

In addition, a secondary air supply passage 13 is diverged from the primary air supply passage 11 between the air pump 12 and the first heat exchanger 14 (heat-receiving side). The secondary air supply passage 13 is converged to the primary air supply passage 11 between the first stack 2 (the cathode 2C) and the second stack 3 (the cathode 3C) (i.e. on an upstream side of the second stack 3). Namely, air is supplied to the second stack 3 (the cathode 3C) by mixed gas of cathode off-gas discharged from the first stack 2 (the cathode 2C) and air flowing through the secondary air supply passage 13. Further, a second heat exchanger 16 (heat-receiving side) is provided on the secondary air supply passage 13. The second heat exchanger 16 heats air being supplied through the secondary air supply passage 13 to temperature adequate for the electricity generation at the second stack 3 by heats of the cathode off-gas being discharged through the after-described off-gas exhaust passage 17 (temperature of the cathode off-gas discharged from the first stack 2 (the cathode 2C) is also taken into account).

The off-gas exhaust passage 17 that exhausts of exhaust gas of the SOFC system 1A directly to atmosphere is connected to the cathode 3C of the second stack 3. In addition, an upstream end of an anode off-gas exhaust passage 18 is connected to the anode 3A of the second stack 3. A downstream end of the anode off-gas exhaust passage 18 is connected to the off-gas exhaust passage 17. A combustor 19, the above-mentioned evaporator 7 (heat-radiating side), the above-mentioned second heat exchanger 16 (heat-radiating side) and the first heat exchanger 14 (heat-radiating side) are provided on the off-gas exhaust passage 17 in this order on a downstream side from the convergent point of the anode off-gas exhaust passage 18. The combustor 19 generates heats by combusting combustible ingredients contained in the exhaust gas flowing through the off-gas exhaust passage 17 (mixed gas of the anode off-gas and the cathode off-gas from the second stack 3). The combustor 19 is provided adjacent to the above-mentioned preheater 8, and thereby the generated heats are utilized by the preheater 8 as described above. The evaporator 7, the second heat exchanger 16 and the first heat exchanger 14 as heat exchangers also utilize, as described above, the heats of the exhaust gas whose temperature is made high by the combustor 19.

Note that, although not shown in FIG. 1, a temperature sensor (temperature detector) is installed to each of the above-mentioned components and supply/exhaust passages if needed, and thereby temperature of each of the components and temperature in each of the supply/exhaust passages (fluid temperature of gas or liquid) are detected. In addition, although not shown in FIG. 1, provided is a controller that controls electricity generation states of the first stack 2 and the second stack 3 and operated states of the pumps 5 and 12 based on the temperatures detected by the temperature sensors.

In the present embodiment, fuel is supplied to the first stack 2 (the anode 2A) by the primary fuel supply passage 4. In addition, fuel is sullied also to the second stack 3 (the anode 3A), as the anode off-gas from the first stack 2, by the primary fuel supply passage 4. It is possible to supply the fuel through the primary fuel supply passage 4 so that fuel constituents are contained in the anode off-gas from the first stack 2. Further, fuel is supplied to the second stack 3 (the anode 3A) also by the secondary fuel supply passage 6.

According to the present embodiment, since a FC stack that can realize electricity generation capacity required for the SOFC system 1A is divided into the first stack 2 and the second stack 3, the temperatures of the first stack 2 on the upstream side can be quickly raised to its operational temperature at the start-up of the SOFC system 1A. An SOFC system has a feature of high efficiency and slow start-up as described above, but the SOFC system 1A can transition to its operable state quickly. After that, the temperature of the second stack 3 on the downstream side ca be also raised to its operational temperature, and thereby the SOFC system 1A can be operated stably.

Especially in the present embodiment, the electricity generation capacity of the first stack 2 on the upstream side is made smaller than that of the second stack 3 on the downstream side. Namely, since the first stack 2 and the second stack 3 are the same kind of an FC stack that is operated by identical fuel, a volumetric capacity of the first stack 2 is smaller than a volumetric capacity of the second stack 3 and thereby the temperature of the first stack 2 can be raised more quickly to its operational temperature.

In addition, in the present embodiment, for generating electricity at the two SOFC stacks of the first stack 2 and the second stack 3, the first reformer 9 is provided on the upstream side of the first stack 2 and the second reformer 10 that utilizes exothermic methanation reactions in addition to endothermic reforming reactions is also provided on the upstream side of the second stack 3. Further, the secondary fuel supply passage 6 for supplying fuel directly to the second reformer 10 is also provided.

Although temperature of the fuel gas decreases due to the endothermic reforming reactions at the first reformer 9, the temperature decrease at the first reformer 9 can be restricted in the present embodiment by reforming fuel required for the whole SOFC system 1A in cooperation of the first reformer 9 and the second reformer 10. Therefore, a required temperature level raised by the preheater 8 can be reduced. In addition, since steam reforming reactions of methane progresses also at the first stack 2 along with its electricity generation as described above, the temperature of the first stack 2 reduces. However, it is enough that the first reformer 9 mainly reforms fuel required for generating electricity at the first stack 2 (but there may be a case of making fuel gas for the second stack 3 contained in the anode off-gas from the first stack 2). Therefore, a large amount of methane is not contained in the reformed gas discharged from the first reformer 9, and thereby the temperature decrease at the first stack 2 can be also restricted.

In addition, it can be considered to introduce air to the first stack 2 (the anode 2A) in order to restrict the temperature decrease, but efficiency of electricity generation reduces when introducing air to the first stack 2 (the anode 2A). According to the present embodiment, it is not needed to introduce air to the first stack 2 (the anode 2A), and thereby quick start-up can be realized without reducing efficiency of electricity generation. Further, since the air introduction is not needed, high-efficiency operations can be done even in the SOFC system with less start-up energy.

Further, when the mixed gas is generated by the mixture of the anode off-gas from the first stack 2 and the fuel liquid supplied through the secondary fuel supply passage 6, it is concerned that the temperature of the mixed gas to be supplied to the second reformer 10 reduces due to vaporizing of the fuel liquid. However, even if the temperature of the mixed gas reduces due to the vaporization heat, it is possible to supply hydrogen-rich reformed gas to the second stack 3 by the second reformer 10 that utilizes endothermic reforming reactions and exothermic methanation reactions according to the present embodiment.

Specifically, it is possible to raise the temperature of the reformed gas discharged from the second reformer 10 and then supplied to the second stack 3 by the exothermic methanation reactions at the second reformer 10. Although hydrogen and $CO/CO_2$ are needed for a methanation reaction, hydrogen and CO that is not used for electricity generation is contained in the anode off-gas from the first stack 2 and methane is hardly contained therein. Therefore, the exothermic methanation reactions can be done effectively at the second reformer 10, and thereby it is possible to generate the hydrogen-rich reformed gas by provoking also the endothermic reforming reactions while restricting the temperature decrease of the reformed gas.

Figure 2:
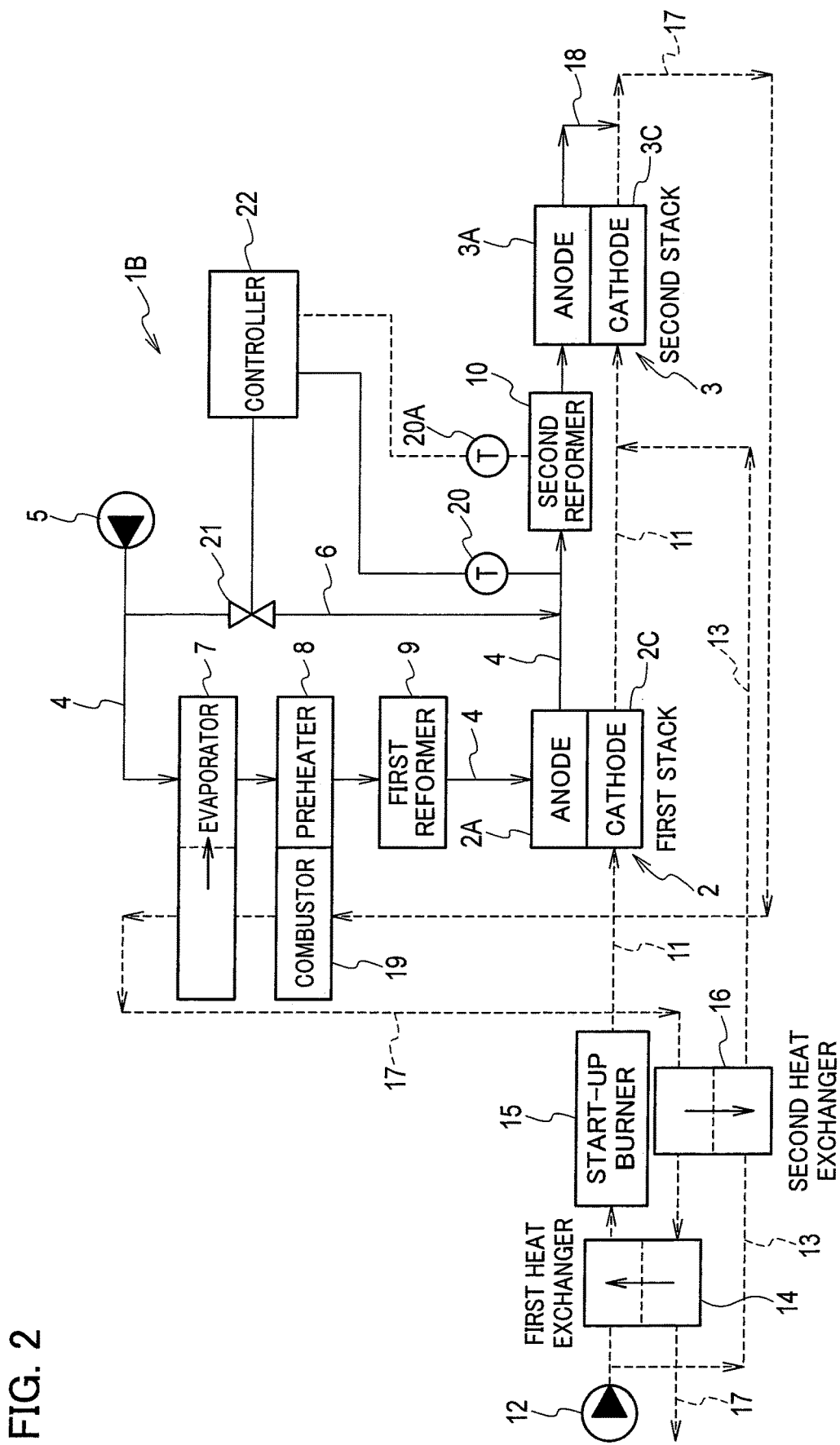
FIG. 2 It is a configuration diagram of a solid oxide fuel cell system according to a second embodiment.

Next, a solid oxide fuel cell (SOFC) system 1B according to a second embodiment will be described. As shown in FIG. 2, the SOFC system 1B includes fundamental configurations equivalent to those of the above-described SOFC system 1A according to the first embodiment. Therefore, the above-described effects brought by the fundamental configurations are also brought by the present embodiment. Hereinafter, different configurations different from those of the SOFC system 1A will be described in detail. In addition, configurations identical to those of the SOFC system 1A of the above-described first embodiment are labelled with identical reference signs, and then their detailed descriptions will be omitted.

In the present embodiment, fuel volume to be supplied to the second reformer 10 through the secondary fuel supply passage 6 is controlled based on "gas temperature at an inlet port of the second reformer 10". Therefore, in the present embodiment, a temperature sensor 20 for detecting temperature of the mixed gas to be supplied to the second reformer 10 is provided just upstream from the second reformer 10 on the primary fuel supply passage 4 in order to detect the gas temperature at the inlet port of the second reformer 10. In addition, a regulator 21 for regulating the fuel volume to be supplied to the second reformer 10 through the secondary fuel supply passage 6 is provided on the secondary fuel supply passage 6. The regulator 21 in the present embodiment is a flow-rate regulating valve. The temperature sensor 20 and the regulator 21 are connected with a controller 22. The controller 22 retrieves the detected gas temperature at the inlet port of the second reformer 10 from the temperature sensor 20, and then controls the fuel volume to be supplied to the second reformer 10 through the secondary fuel supply passage 6 by controlling the regulator 21 based on the gas temperature at the inlet port of the second reformer 10. Temperature of exhaust gas from the second reformer 10 can be controlled by controlling the fuel volume supplied to the second reformer 10. As the result, the second stack 3 can be operated stably by keeping the temperature of the second stack 3 at its adequate operational temperature.

Figure 3:
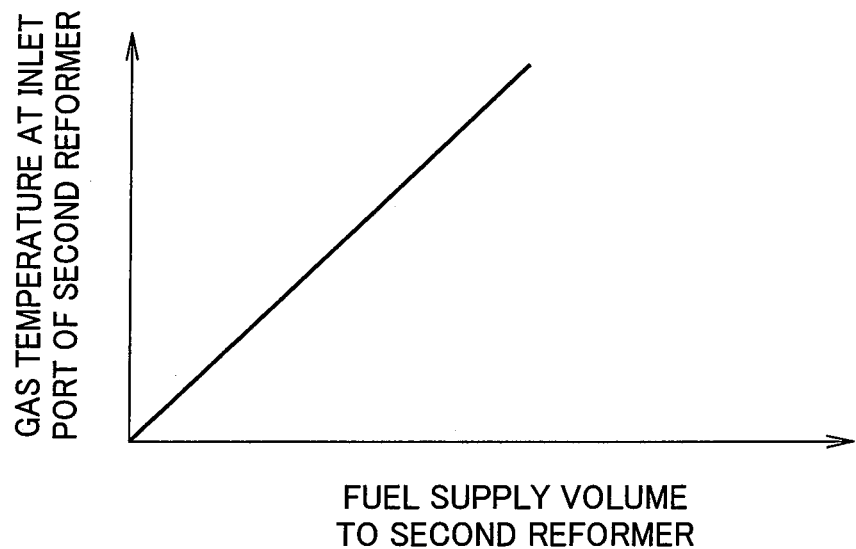
FIG. 3 It is a graph showing a relation between gas temperature at an inlet port of a second reformer and fuel supply volume to the second reformer through a secondary fuel supply passage.

Specifically, as shown in FIG. 3, the lower the gas temperature at the inlet port of the second reformer 10 is, the less the fuel supply volume to the second reformer 10 is made. In other words, the lower the gas temperature at the inlet port of the second reformer 10 is, the less the apportionment to the second reformer 10 is made. If the gas temperature at the inlet port of the second reformer 10 is low, the endothermic reforming reactions and the exothermic methanation reactions at the second reformer 10 become less progressed. Therefore, the temperature decrease of the mixed gas due to the vaporization heat of the fuel liquid is avoided by making the fuel supply volume to the second reformer 10 less as the gas temperature at the inlet port of the second reformer 10 becomes lower. On the other hand, the temperature of the second reformer 10 is kept at its appropriate temperature range by making the fuel supply volume to the second reformer 10 more as the gas temperature at the inlet port of the second reformer 10 becomes higher.

Figure 4:
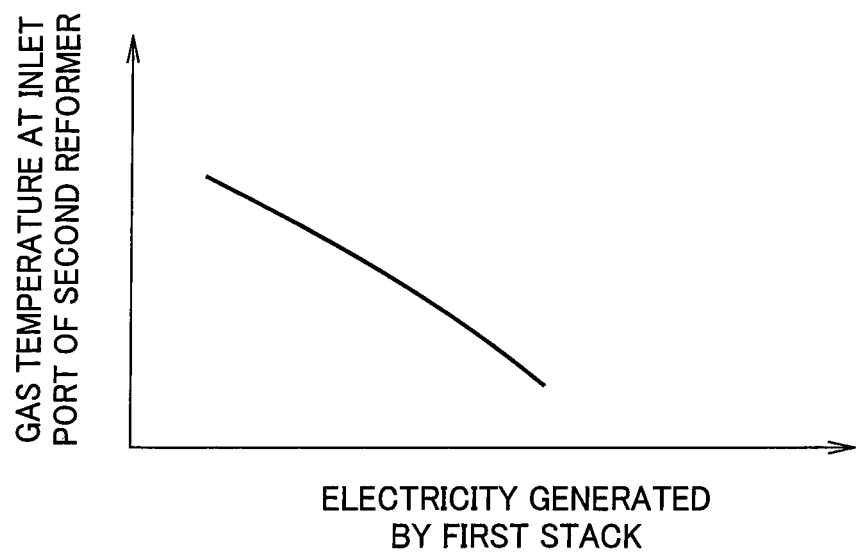
FIG. 4 It is a graph showing a relation between the gas temperature at the inlet port of the second reformer and electricity generated by a first stack.

Further, in the present embodiment, the electricity generated by the first stack 2 is controlled based on the "the gas temperature at the inlet port of the second reformer 10". Specifically, as shown in FIG. 4, the lower the gas temperature at the inlet port of the second reformer 10 is, the more the electricity generated by the first stack 2 is made. The electricity generated by the first stack 2 is controlled by changing its load. If the gas temperature at the inlet port of the second reformer 10 is low, not only the reforming reactions but also the exothermic methanation reactions don't progress as described above. Therefore, the temperature decrease at the first stack 2 is restricted by increase the electricity generated by the first stack 2 in order to increase the temperature of the anode off-gas of the first stack 2 (the anode 2A) to be supplied to the second reformer 10. On the other hand, when the gas temperature at the inlet port of the second reformer 10 is high, in order to keep the temperature of the second reformer 10 at the appropriate temperature range, the temperature of the anode off-gas from the first stack 2 (the anode 2A) is decreased by reducing the electricity generated by the first stack 2 and then is reduced the temperature of the second reformer 10 back into the appropriate temperature range.

As described above, in the present embodiment, the gas temperature at the inlet port of the second reformer 10 is detected by the temperature sensor 20 provided just upstream from the second reformer 10 on the primary fuel supply passage 4. However, as shown by a dotted line in FIG. 2, the gas temperature at the inlet port of the second reformer 10 may be detected by providing a temperature sensor 20A near the inlet port of the second reformer 10. Although the temperature sensor 20 (20A) is provided as the temperature detector in the present embodiment, the temperature detector may be a thermoelectric couple, and it is preferable that it can measure a temperature range required for the control and can measure with a response speed required for the control.

In addition, the regulator 21 is the flow-rate regulating valve provided on the secondary fuel supply passage 6 in the present embodiment. However, the regulator that regulates fuel volume to be supplied to the second reformer 10 through the secondary fuel supply passage 6 may be a three-way valve provided at a diverged position of the secondary fuel supply passage 6 from the primary fuel supply passage 4. Or, a flow-rate regulating valve may be provided on each of the primary fuel supply passage 4 and the secondary fuel supply passage 6 as the regulator. Or, a fuel pump for the primary fuel supply passage 4 and a pump for the secondary fuel supply passage 6 may be provided as the regulator.

Note that the control of the fuel supply volume to the second reformer 10 based on the gas temperature at the inlet port of the second reformer 10 and the control of the electricity generated by the first stack 2 based on the gas temperature at the inlet port of the second reformer 10 are carried out in parallel in the present embodiment. However, only one of these two controls may be adopted.

Next, supplies of the fuel gas (the mixed gas of the anode off-gas from the first stack 2 and the fuel supplied from the secondary fuel supply passage 6) inside the second reformer 10 will be described.

Although the endothermic reforming reactions and the exothermic methanation reactions are provoked in the second reformer 10 as described above, a catalyst core 10a (see FIG. 6 and FIG. 8) on which reforming catalytic agents and methanation catalytic agents are supported is housed inside the second reformer 10. Since operational temperature of an SOFC is high as described above, temperature of gas flowing inside the SOFC system 1A or 1B is high. Therefore, ceramic is generally used for a base material of the catalyst core 10a, the catalyst core 10a is made as a porous core or a honeycomb core in order to increase its reactive area with the fuel gas. Note that the catalyst core may be formed by uniformly packing a large number of granular materials (such as pellets) into a circular cylindrical shape. In this case, the reforming catalytic agents and the methanation catalytic agents are supported on surfaces of the pellets.

Figure 5:
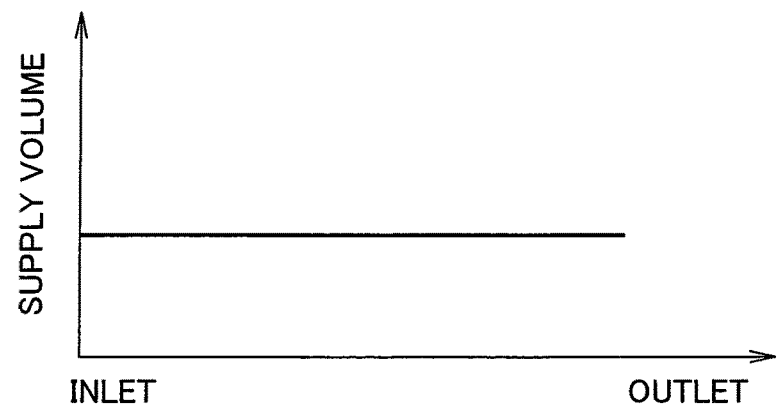
FIG. 5 It is a graph showing a state of fuel supply (first example) in the second reformer.

First, in a first example shown in FIG. 5, the fuel gas is supplied to the catalyst core 10a with fixed volume from its inlet port to its outlet port along a flow direction of the fuel gas in the second reformer 10 (the catalyst core 10a). Specifically, as shown in FIG. 6(a), a fuel supply pipe 10b on which plural fuel ejection holes are formed along its longitudinal direction is arranged above (beside) the catalyst core 10a. The fuel ejection holes are directed toward the catalyst core 10a, and the fuel is ejected toward the catalyst core 10a. Supply volume (ejected amount) is controlled by a diameter of the ejection holes.

Note that, in FIG. 6(a), lengths of arrows indicate a magnitude of the supply volume (similarly in after-described FIG. 6(b), FIG. 8(a) and FIG. 8(b)). In addition, a downstream end of the fuel supply pipe 10b may be opened or may be closed (similarly in after-described FIG. 6(b), FIG. 8(a) and FIG. 8(b)). In a case where the downstream end of the fuel supply pipe 10b is opened, the fuel gas that has not ejected from the ejection holes is discharged from the downstream end of the fuel supply pipe 10b to a space where the catalyst core 10*a* is housed. In this manner, in the case where the fuel supply pipe 10*b* is arranged above (beside) the catalyst core 10*a*, the second reformer 10 can be easily manufactured.

Figure 6:
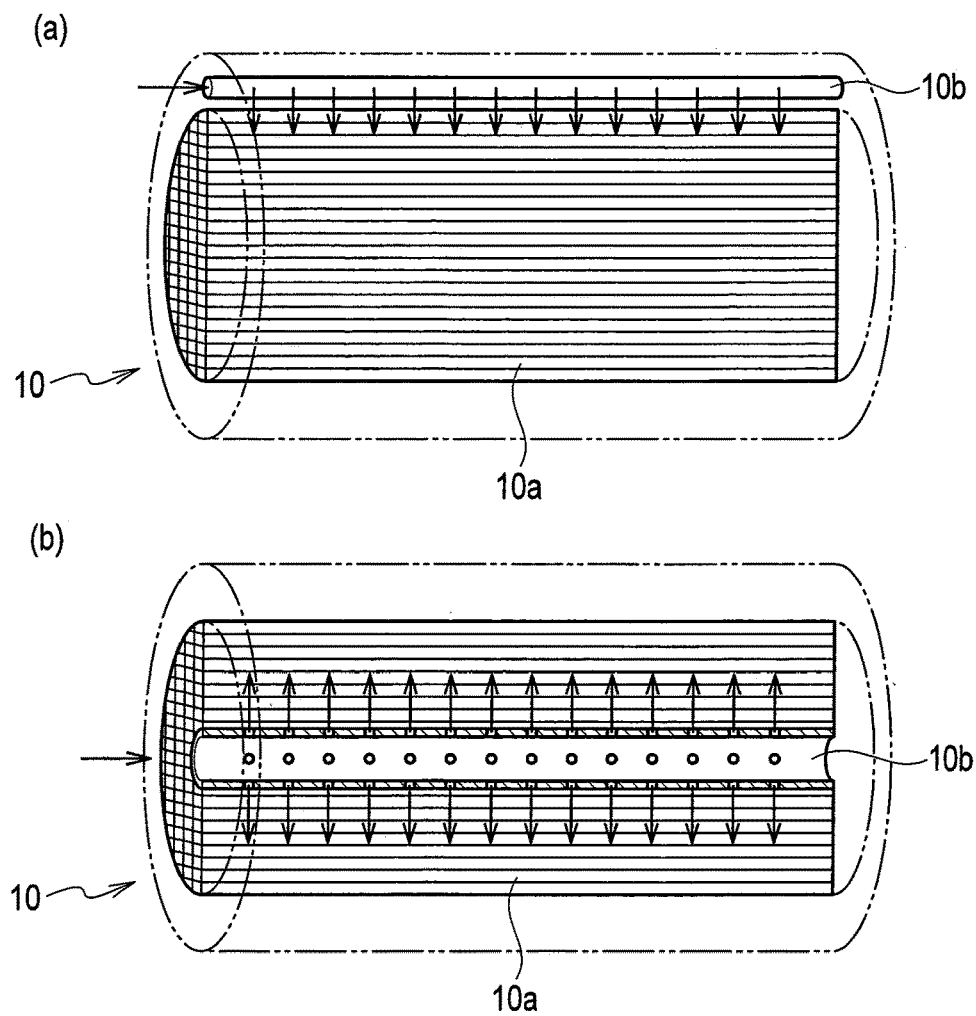
FIG. 6 These are schematic perspective view of the second reformer according to the first example; (a) shows an example in which a fuel supply pipe is arranged beside a reforming catalyst core, and (b) shows an example in which a fuel supply pipe is arranged at the center of a reforming catalyst core.

Or, as shown in FIG. 6(*b*), the fuel supply pipe 10*b* is arranged along the center of the catalyst core 10*a*. In this case, the fuel gas is ejected from the inside of the catalyst core 10*a*. In the case where the fuel supply pipe 10*b* is arranged at the center of the catalyst core 10*a* in this manner, the fuel gas can be supplied effectively to the catalyst core 10*a* that is a porous core or a honeycomb core.

Figure 7:
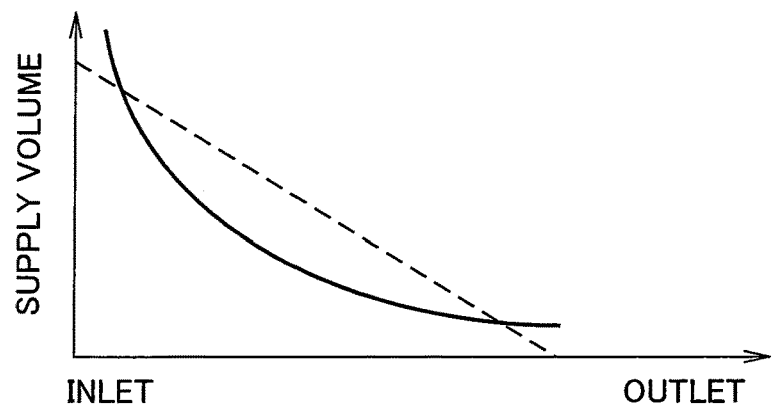
FIG. 7 It is a graph showing a state of fuel supply (second example) in the second reformer.
Figure 8:
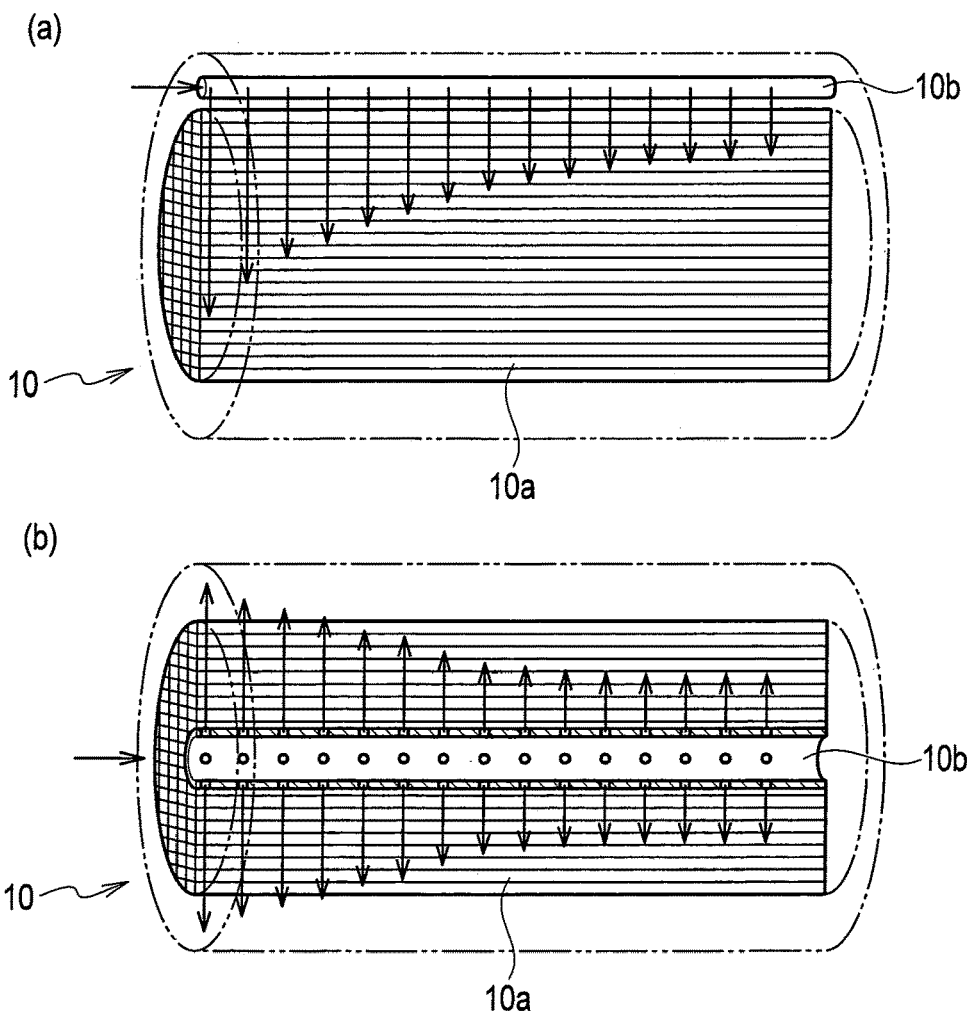
FIG. 8 These are schematic perspective view of the second reformer according to the second example; (a) shows an example in which a fuel supply pipe is arranged beside a reforming catalyst core, and (b) shows an example in which a fuel supply pipe is arranged at the center of a reforming catalyst core.

Next, in a second example shown in FIG. 7, the fuel gas is supplied to the catalyst core 10*a* so that supply volume (ejected amount) on a side of the inlet port is larger than supply volume (ejected amount) on a side of the outlet port along the flow direction of the fuel gas in the second reformer 10 (the catalyst core 10*a*). Specifically, as shown in FIG. 8(*a*), a fuel supply pipe 10*b* on which plural fuel ejection holes are formed along its longitudinal direction is arranged above (beside) the catalyst core 10*a*. The fuel ejection holes are directed toward the catalyst core 10*a*, and the fuel is ejected toward the catalyst core 10*a*. Supply volume (ejected amount) is controlled by a diameter of the ejection holes. In this manner, in the case where the fuel supply pipe 10*b* is arranged above (beside) the catalyst core 10*a*, the second reformer 10 can be easily manufactured.

Or, as shown in FIG. 8(*b*), the fuel supply pipe 10*b* is arranged along the center of the catalyst core 10*a*. In this case, the fuel gas is ejected from the inside of the catalyst core 10*a*. In the case where the fuel supply pipe is arranged at the center of the catalyst core 10*a* in this manner, the fuel gas can be supplied effectively to the catalyst core 10*a* that is a porous core or a honeycomb core.

As described above, the ejection holes are formed so that the supply volume (ejected amount) on the side of the inlet port is larger than the supply volume (ejected amount) on the side of the outlet port in the present second example. Here, the fuel gas supplied on the side of the inlet port has higher possibility (longer distance for contacting with the catalytic agents) of being utilized for the reforming reactions and the methanation reactions than the fuel gas supplied on the side of the outlet port. Therefore, it is possible to reduce fuel gas that has not reformed and methanized and then discharged from the second reformer 10 by forming the ejection holes so that the supply volume (ejected amount) on the side of the inlet port is larger than the supply volume (ejected amount) on the side of the outlet port. In addition, since the reforming reactions and the methanation reactions are provoked surely, it is possible to supply fuel gas having temperature and characteristics adequate for electricity generation to the second stack 3.

As shown in FIG. 5 to FIG. 8, it is possible to supply fuel with small volumes by supplying (ejecting) the fuel by use of the fuel supply pipe 10*b* extended along the flow direction of the fuel gas, and thereby the reforming reactions and the methanation reactions can be provoked in a balanced manner. Note that, in any case of FIG. 6(*a*), FIG. 6(*b*), FIG. 8(*a*) and FIG. 8(*b*), it is preferable that the arrangement position of the fuel supply pipe 10*b* is determined according to an installed position and an installed orientation of the second reformer 10 in the SOFC system 1A or 1B, a shape of the catalyst core 10*a* and so on so that the endothermic reforming reactions and the exothermic methanation reactions progress in a balanced manner. In addition, the supply volume is reduced in an exponential manner from the inlet port toward the outlet port in the present second example as shown by a solid line in FIG. 7. However, the supply volume may be reduced in a linear manner from the inlet port toward the outlet port as shown by a dashed line in FIG. 7.

Next, formation of catalytic layer(s) on the catalyst core 10*a* will be described.

Figure 9:
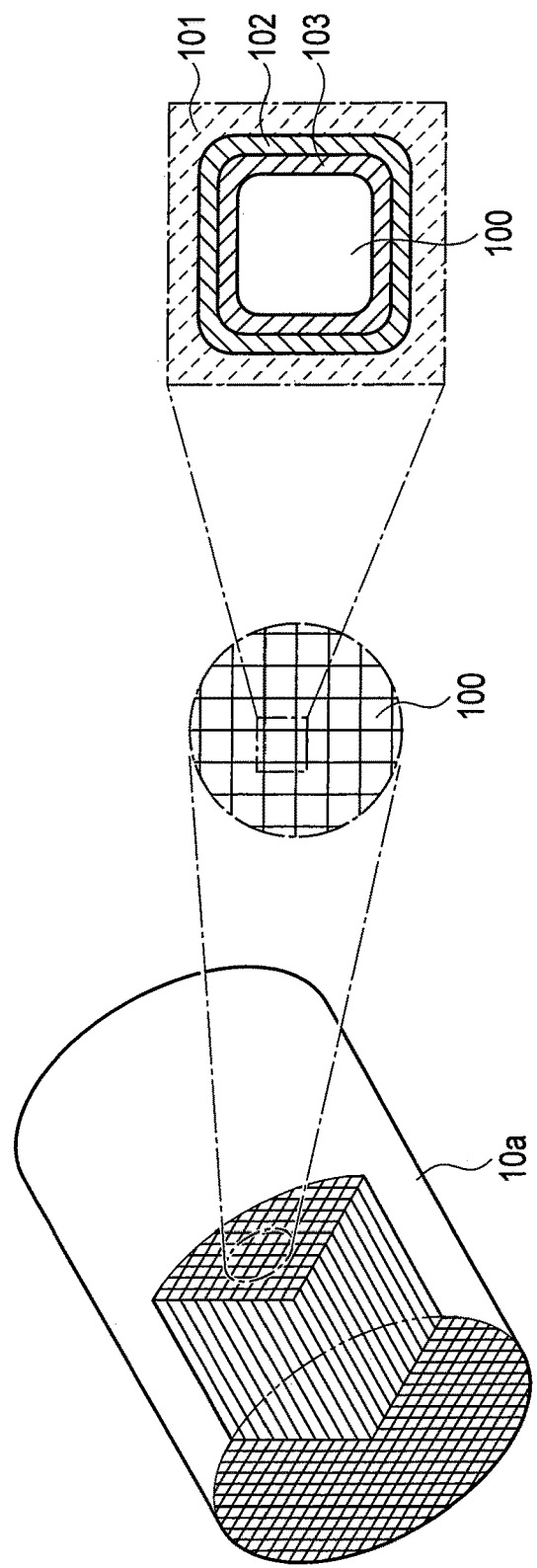
FIG. 9 It is a cross-sectional view (and a perspective view) showing a formation state (first example) of a methanation catalytic layer and a reforming catalytic layer in the reforming catalyst core.

As shown in FIG. 9, the catalyst core 10*a* is a honeycomb core having a circular cylindrical shape, and provided with a large number of gas flow passages 100 each having a square cross-sectional shape (may be another cross-sectional shape such as a hexagonal cross-sectional shape and a circular cross-sectional shape). Note that the catalyst core 10*a* may not a honeycomb core, but may be a porous core such as metal foam. The gas flow passage(s) 100 is extended along the flow direction of the fuel gas. In a first example shown in FIG. 9, a reforming catalytic layer 102 and a methanation catalytic layer 103 are supported on a base material (support) 101 of the catalyst core 10*a*. Namely, the reforming catalytic layer 102 and the methanation catalytic layer 103 are provided adjacently to each other, and thereby it is possible to promote the reforming reactions at the reforming catalytic layer 102 while restricting temperature reduction of the reforming catalytic layer 102 by heats generated by the exothermic methanation reactions at the methanation catalytic layer 103. In addition, in the first example shown in FIG. 9, the methanation catalytic layer 103 is disposed as a surface layer and the reforming catalytic layer 102 is disposed on its inner side. Therefore, gas can be restricted from being cooled by the endothermic reforming reactions at the reforming catalytic layer 102.

Here, Rh, Ru, Ni and Co based catalytic agents are generally used as the reforming catalytic agents that form the reforming catalytic layer 102. Noble metal such as Pt, Pd and Ir may be used as the reforming catalytic agents. The reforming catalytic agents is used by supporting the above-mentioned active metal(s) on the base material (support) 101 such as alumina, ceria, zirconia, magnesia, titania, silica or the like (the methanation catalytic layer 103 is interposed between the base material (support) 101 and the reforming catalytic layer 102 in the example shown in FIG. 9). Alkali metal, alkali-earth metal, rare-earth metal and so on are added thereto in order to prevent carbon deposition from fuel (hydro carbon or the like) containing carbon and improve activity. If carbon deposits, not only a gas flow is inhibited but also the fuel gas gets hard to reach the reforming catalytic layer 102 by the carbon.

On the other hand, Ni, Ru, Co and Mo based catalytic agents are generally used as the methanation catalytic agents that form the methanation catalytic layer 103. Noble metal such as Pt, Pd and Ir may be used as the methanation catalytic agents. The methanation catalytic agents is used by supporting the above-mentioned active metal(s) on the base material (support) 101 such as alumina, ceria, zirconia, magnesia, titania, silica or the like. Alkali metal, alkali-earth metal, rare-earth metal and so on are added thereto in order to prevent carbon deposition from fuel (hydro carbon or the like) containing carbon and improve activity. If carbon deposits, not only a gas flow is inhibited due to reduction of a cross-sectional area of the gas flow passage(s) 100 but also the fuel gas gets hard to reach the methanation catalytic layer 103 with a surface of the methanation catalytic layer 103 covered by the carbon.

Figure 10:
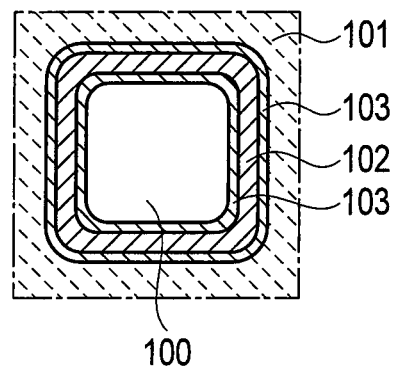
FIG. 10 It is a cross-sectional view showing a formation state (second example) of a methanation catalytic layer and a reforming catalytic layer in the reforming catalyst core.

In a second example shown in FIG. 10, the methanation catalytic layer 103 is further provided also on an inner side of the inner-side reforming catalytic layer 102 in FIG. 9. According to this configuration, it is possible to promote the reforming reactions further at the reforming catalytic layer 102 while restricting temperature reduction of the reforming catalytic layer 102 by heats generated by the exothermic methanation reactions at the two methanation catalytic layers 103. In addition, since the reforming catalytic layer 102 is sandwiched by the two methanation catalytic layers 103, it is possible to restrict the base material 101 from being cooled by the endothermic reforming reactions at the reforming catalytic layer 102 and thereby to restrict the temperature of the whole catalyst core 10a from reducing. Since the methanation catalytic layer 103 is disposed as a surface layer as described above, it is possible to restrict gas from being cooled by the endothermic reforming reactions at the reforming catalytic layer 102.

In addition, in consideration of balancing between the endothermic reforming reactions and the exothermic methanation reactions, the methanation catalytic agents are generally needed more than the reforming catalytic agents. The methanation reactions progress at 250 to 450° C., but the reactions get hard to progress if temperature becomes low and thereby a large amount thereof is needed. On the other hand, the reforming reactions progress at 500 to 700° C. and noble metal can be used for them, and thereby the reforming catalytic agents can be made less than the methanation catalytic agents. Therefore, by arranging the reforming catalytic layer 102 and the two methanation catalytic layers 103 as shown in FIG. 10, it is possible to provoke the endothermic reforming reactions and the exothermic methanation reactions effectively (in a balanced manner).

Figure 11:
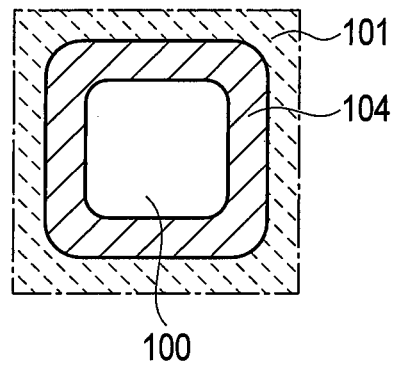
FIG. 11 It is a cross-sectional view showing a formation state (third example) of a methanation catalytic layer and a reforming catalytic layer in the reforming catalyst core.

In a third example shown in FIG. 11, a mixed layer 104 that is made by slurry-mixing the reforming catalytic agents and the methanation catalytic agents is supported on the base material 101. In order to slurry-coating the mixed layer 104, slurries of the two catalytic agents are mixed, or powders of the two catalytic agents are mixed and then made into slurry. Also by disposing the reforming catalytic layer and the methanation catalytic layer adjacent to each other in this manner, it is possible to promote the reforming reactions at the reforming catalytic layer 102 while restricting temperature reduction of the reforming catalytic agents (layer) by heats generated by the exothermic methanation reactions at the methanation catalytic agents (layer).

Figure 12:
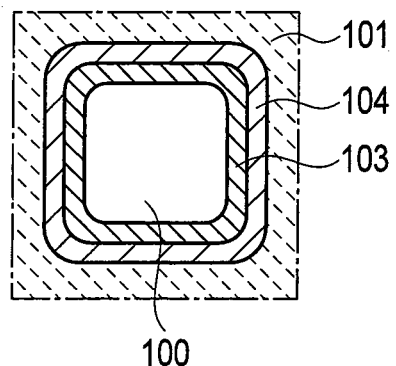
FIG. 12 It is a cross-sectional view showing a formation state (fourth example) of a methanation catalytic layer and a reforming catalytic layer in the reforming catalyst core.

In a fourth example shown in FIG. 12, the methanation catalytic layer 103 is further provided on an outer side of the mixed layer 104 in FIG. 11. According to this configuration, it is possible to utilize heats generated also by the exothermic methanation reactions at the outer-side (surface layer) methanation catalytic layer 103 for restricting the temperature reduction of the reforming catalytic layer 102 and thereby to promote the reforming reactions further at the reforming catalytic layer 102. In addition, since the methanation catalytic layer 103 is disposed as a surface layer, gas can be restricted from being cooled by the endothermic reforming reactions at the reforming catalytic layer 102. Further, since the methanation catalytic agents are needed more than the reforming catalytic agents as described above, it is possible to provoke the endothermic reforming reactions and the exothermic methanation reactions effectively (in a balanced manner) by disposing the methanation catalytic layer 103 on the outer side.

The present invention is not limited to the above embodiments. For example, the above-described SOFC systems 1A and 1B are utilized as a drive source for an FCEV. However, the present invention can be applied to a stationary FC system. In addition, the above-described SOFC systems 1A and 1B is a multi-stage FC system having the two SOFC stacks (the first stack and the second stack), but it can be applied to a multi-stage FC system having three or more SOFC stacks. In this case, it is not needed that the above-described first stack 2 is the most-upstream FC stack, it is enough that it is located upstream from the second stack 3. Similarly, it is not needed that the second stack 3 is disposed next-to and downstream-from the first stack 2, but it is enough that it is located downstream from the first stack 2.

INDUSTRIAL APPLICABILITY

According to the present invention, a solid oxide fuel cell system can be provided.

REFERENCE SIGNS LIST 1A, 1B solid oxide fuel cell system (SOFC system)
2 first stack (fuel cell (FC) stack)
3 second stack (fuel cell (FC) stack)
4 primary fuel supply passage
6 secondary fuel supply passage
9 first reformer
10 second reformer
10a catalyst core
10b fuel supply pipe
100 gas supply passage
101 base material (support)
102 reforming catalytic layer
103 methanation catalytic layer
104 mixed layer (reforming catalytic agents+reforming catalytic agents)
11 primary air supply passage
13 secondary air supply passage
17 off-gas exhaust passage
18 anode off-gas exhaust passage
20, 20A temperature sensor (temperature detector)
21 regulator (flow-rate regulating valve)
22 controller

The invention claimed is:
1. A solid oxide fuel cell system comprising:
a primary fuel supply passage that supplies fuel;
a plurality of fuel stacks that are provided in line on the primary fuel supply passage and include at least a first fuel cell stack on an upstream side and a second fuel cell stack on a downstream side, and each of which uses a solid oxide fuel cell;
a first reformer that is provided on an upstream side from the first fuel cell stack on the primary fuel supply passage, and includes reforming catalytic agents for endothermic reforming reactions to reform the fuel by utilizing the endothermic reforming reactions;
a second reformer that is provided between the first fuel cell stack and the second fuel cell stack on the primary fuel supply passage, and includes methanation catalytic agents for exothermic methanation reactions in addition to reforming catalytic agents for endothermic reforming reactions to reform the fuel by utilizing the exothermic methanation reactions in addition to the endothermic reforming reactions;
a heating device that is provided at an upstream side from the first reformer and provides heat to the fuel being supplied through the primary fuel supply passage;
a secondary fuel supply passage that diverges from the primary fuel supply passage at an upstream side from the heating device and is connected to the primary fuel supply passage between the first fuel cell stack and the second reformer;
a temperature sensor that detects gas temperature at an inlet port of the second reformer;

a regulator that regulates fuel volume to be supplied to the second fuel cell stack through the secondary fuel supply passage; and a controller that is configured to control the regulator based on the gas temperature, detected by the temperature sensor, at the inlet port of the second reformer, wherein the controller is configured to control the fuel volume such that the lower the gas temperature detected by the temperature sensor at the inlet port of the second reformer becomes, the less the fuel volume supplied to the second reformer becomes.

2. The solid oxide fuel cell system according to claim 1, wherein a fuel supply pipe extending in a flow direction of the fuel is provided inside the second reformer, and a plurality of fuel ejection holes are formed on the fuel supply pipe along a longitudinal direction thereof.

3. The solid oxide fuel cell system according to claim 2, wherein the plurality of fuel ejection holes are formed along the longitudinal direction such that an ejected amount on an upstream side is larger than an ejected amount on a downstream side.

4. The solid oxide fuel cell system according to claim 1, wherein, inside the second reformer, a reforming catalytic layer for the endothermic reforming reactions is provided adjacently to a methanation catalytic layer for the exothermic methanation reactions.

5. The solid oxide fuel cell system according to claim 4, wherein the methanation catalytic layer is disposed as a surface layer, and the reforming catalytic layer is disposed on an inner side of the methanation catalytic layer.

6. The solid oxide fuel cell system according to claim 5, wherein a second methanation catalytic layer is further disposed on an inner side of the reforming catalytic layer.

7. The solid oxide fuel cell system according to claim 1, wherein, inside the second reformer, a methanation catalytic layer for the exothermic methanation reactions is disposed as a surface layer, and a mixed layer of reforming catalytic agents for the endothermic reforming reactions and methanation catalytic agents for the exothermic methanation reactions is disposed on an inner side of the methanation catalytic layer.

8. A solid oxide fuel cell system comprising:

a primary fuel supply passage that supplies fuel;

a plurality of fuel stacks that are provided in line on the primary fuel supply passage and include at least a first fuel cell stack on an upstream side and a second fuel cell stack on a downstream side, and each of which uses a solid oxide fuel cell;

a first reformer that is provided on an upstream side from the first fuel cell stack on the primary fuel supply passage, and includes reforming catalytic agents for endothermic reforming reactions to reform the fuel by utilizing the endothermic reforming reactions;

a second reformer that is provided between the first fuel cell stack and the second fuel cell stack on the primary fuel supply passage, and includes methanation catalytic agents for exothermic methanation reactions in addition to reforming catalytic agents for endothermic reforming reactions to reform the fuel by utilizing the exothermic methanation reactions in addition to the endothermic reforming reactions;

a heating device that is provided at an upstream side from the first reformer and provides heat to the fuel being supplied through the primary fuel supply passage;

a secondary fuel supply passage that diverges from the primary fuel supply passage at an upstream side from the heating device and is connected to the primary fuel supply passage between the first fuel cell stack and the second reformer;

a temperature sensor that detects gas temperature at an inlet port of the second reformer; and a controller that is configured to control electricity generated by the first fuel cell stack such that the lower the gas temperature detected by the temperature sensor at the inlet port of the second reformer becomes, the more the electricity generated by the first fuel cell stack becomes.

9. The solid oxide fuel cell system according to claim 8, further comprising a regulator that regulates fuel volume to be supplied to the second fuel cell stack through the secondary fuel supply passage;

wherein the controller is configured to control the regulator based on the gas temperature, detected by the temperature sensor, at the inlet port of the second reformer.

10. The solid oxide fuel cell system according to claim 9, wherein the controller is configured to control the fuel volume such that the lower the gas temperature detected by the temperature sensor at the inlet port of the second reformer becomes, the less the fuel volume supplied to the second reformer becomes.

11. The solid oxide fuel cell system according to claim 8, wherein:

a fuel supply pipe extending in a flow direction of the fuel is provided inside the second reformer, and a plurality of fuel ejection holes are formed on the fuel supply pipe along a longitudinal direction thereof.

12. The solid oxide fuel cell system according to claim 11, wherein the plurality of fuel ejection holes are formed along the longitudinal direction such that an ejected amount on an upstream side is larger than an ejected amount on a downstream side.

13. The solid oxide fuel cell system according to claim 8, wherein inside the second reformer, a reforming catalytic layer for the endothermic reforming reactions is provided adjacently to a methanation catalytic layer for the exothermic methanation reactions.

14. The solid oxide fuel cell system according to claim 13, wherein the methanation catalytic layer is disposed as a surface layer, and the reforming catalytic layer is disposed on an inner side of the methanation catalytic layer.

15. The solid oxide fuel cell system according to claim 14, wherein a second methanation catalytic layer is further disposed on an inner side of the reforming catalytic layer.

16. The solid oxide fuel cell system according to claim 8, wherein inside the second reformer, a methanation catalytic layer for the exothermic methanation reactions is disposed as a surface layer, and a mixed layer of reforming catalytic agents for the endothermic reforming reactions and methanation catalytic agents for the exothermic methanation reactions is disposed on an inner side of the methanation catalytic layer.

* * * * *